(12) United States Patent
Schulz (10) Patent No.: US 12,183,483 B2
(45) Date of Patent: Dec. 31, 2024

(54) CABLE UNIT

(71) Applicant: W. L. Gore & Associates GmbH, Putzbrunn (DE)

(72) Inventor: Carsten Schulz, Putzbrunn (DE)

(73) Assignee: W.L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 18/077,744

(22) Filed: Dec. 8, 2022

(65) Prior Publication Data

US 2023/0187102 A1    Jun. 15, 2023

(30) Foreign Application Priority Data

Dec. 10, 2021   (CN) .......................... 202123107852.5
Dec. 10, 2021   (KR) ........................ 20-2021-0003769

(51) Int. Cl.
   H01B 7/08    (2006.01)
   H01B 7/04    (2006.01)
   H01B 7/18    (2006.01)

(52) U.S. Cl.
   CPC ........... *H01B 7/0869* (2013.01); *H01B 7/041* (2013.01); *H01B 7/1875* (2013.01)

(58) Field of Classification Search
   CPC .......... H01B 7/08; H01B 7/041; H02G 11/00; F16L 13/16
   USPC ................... 174/117 F; 248/49, 74.3; 59/78.1
   See application file for complete search history.

(56) References Cited

U.S. PATENT DOCUMENTS

| | | | | |
|---|---|---|---|---|
| 4,412,092 A | * | 10/1983 | Hansell, III | ......... H01B 7/0838 174/103 |
| 6,858,797 B2 | | 2/2005 | Sheikholeslami et al. | |
| 9,269,401 B2 | * | 2/2016 | Randall | ................ H01B 7/0823 |
| 2011/0121141 A1 | | 5/2011 | Tatsuta et al. | |
| 2013/0009018 A1 | * | 1/2013 | Palahnuk | ............ H02G 3/0437 156/278 |
| 2022/0076862 A1 | * | 3/2022 | Nakano | .................... H01B 7/40 |

FOREIGN PATENT DOCUMENTS

| | | | |
|---|---|---|---|
| JP | 2017-021903 | * | 1/2017 |
| KR | 10-2017-0082104 A | | 7/2017 |
| KR | 20190066248 | * | 6/2019 |
| KR | 10-2019-0136842 A | | 12/2019 |

OTHER PUBLICATIONS

European Search Report for EP Patent Application No. 22212195.6, Issued on Apr. 21, 2023, 11 pages.

* cited by examiner

*Primary Examiner* — Chau N Nguyen
(74) *Attorney, Agent, or Firm* — Faegre Drinker Biddle & Reath (57) ABSTRACT

A cable unit is provided comprising: a jacket comprising at least one cable housing and at least one support housing; the or each cable housing having a tubular structure, extending in a longitudinal direction, each support housing in the plurality of support housings having a tubular structure, extending in the longitudinal direction, wherein the at least one support housing being disposed on one side of the at least one cable housing; and at least one support element retained within each support housing of the plurality of support housings, wherein the at least one support element retained within each support housing of the plurality of support housings comprises at least one portion that has an arcuate cross section in the width direction.

13 Claims, 11 Drawing Sheets

Cross section B - B

Cross section C - C

CABLE UNIT

CROSS-REFERENCE TO RELATED APPLICATION

This application is a claims priority to CN Application Number 202123107852.5, filed Dec. 10, 2021 and issued as CN Utility Model Number 217134036U, and also claims priority to KR Application Number KR20-2021-0003769, filed Dec. 10, 2021, which are incorporated herein by reference in their entireties for all purposes.

TECHNICAL FIELD

The present disclosure relates to cable units, specifically to cable units used to connect a fixed entity to a moving entity.

BACKGROUND

A cable for supplying power or transmitting signals is used in a machine used in a clean room for displays, OLEDs, LCDs, semiconductors, and the like. Such a machine repeatedly moves along various moving paths that are previously designed to match process characteristics. In this case, the cable may become twisted or may buckle or sag as the machine moves.

There has been proposed a method for accommodating a cable in a cable track chain or a flexible pod so that the cable moves while being safely protected and for guiding the cable by having articulated chains disposed on both sides of the cable to allow the cable to move while being maintained in a linear state or bent state.

However, in the state in which the articulated chain is bent, folding wrinkles occur on the pod along a radius of curvature. Also, there is a problem that the folding wrinkles become torn, or dust is generated due to friction with the articulated chain in the process of repeated bending and unbending.

Also, there is a problem that when the pods are disposed to overlap each other in multiple layers, friction increases between the pod disposed on the inside and the pod disposed on the outside with respect to the radius of curvature caused by the folding wrinkles generated in a bent position to generate dust through abrasion or wear, and the pod is torn. Particularly, there is a problem that when the cable moves in a longitudinal direction and in a width or transverse direction at the same time, the cable slips off and cannot maintain the arrangement in which the cables are stacked in multiple layers.

SUMMARY

In a first aspect there is provided a cable unit, characterised in that the cable unit comprises:
a jacket comprising at least one cable housing and at least one support housing; the or each cable housing having a tubular structure, extending in a longitudinal direction, each support housing in the plurality of support housings having a tubular structure, extending in the longitudinal direction, wherein the at least one support housing being disposed on one side of the at least one cable housing; and at least one support element retained within each support housing of the plurality of support housings, wherein the at least one support element retained within each support housing of the plurality of support housings comprises at least one portion that has an arcuate cross section in the width direction.

In some embodiments, the jacket may comprise at least two support housings. At least one support housing may be disposed on each side of the at least one cable housing in a width direction. The at least two support housing and the at least one cable housing may be disposed in parallel to each other.

The cable housing may be a flexible cable housing. Accordingly, the flexible cable housing may be configured to flex or bend.

The support housing may be a flexible support housing. Accordingly, the flexible support housing may be configured to flex or bend.

In some embodiments, at least one cable may be retained within the or each cable housing.

In some embodiments, at least one tube may be retained within the or each cable housing.

In some embodiments, at least one cable and at least one tube may be retained within at least one of the at least one cable housing.

The cable unit may be configured to be self-supporting. The cable unit may be configured to extend unsupported for a distance of at least 100 mm. The cable unit may be configured to extend unsupported for a distance of at least 200 mm. The cable unit may be configured to extend unsupported for a distance of at least 300 mm. The cable unit may be configured to extend unsupported for a distance of at least 400 mm. The cable unit may be configured to extend unsupported for a distance of at least 500 mm. The cable may be configured to extend unsupported for a distance of from 100 mm to 700 mm. The cable may be configured to extend unsupported for a distance of from 200 mm to 700 mm. The cable may be configured to extend unsupported for a distance of from 300 mm to 700 mm. The cable may be configured to extend unsupported for a distance of from 400 mm to 700 mm. The cable may be configured to extend unsupported for a distance of from 500 mm to 700 mm.

As referred to herein, the term "self-supporting" refers to a cable unit that can extend horizontally for a distance whilst retaining its shape or form without sagging or otherwise collapsing.

It has been found that a cable unit comprising a plurality of support housings provided on each side of the at least one cable housing in a width direction reduces the resistance to curvature of the cable unit when compared to cable units where at least one support housing is provided out of the width direction. Further the arrangement does not compromise the strength of the cable unit.

Typically, the cable unit may be used to connect a moving or mobile unit and a stationary unit. In embodiments comprising at least one cable retained within the or each cable housing, electrical power may be transmitted from the stationary unit to the moving unit. The cable unit may be used to connect a moving unit and a stationary unit such that an electrical signal may be transmitted between the moving unit and the stationary unit. For example, the cable unit may allow an electrical signal to be transmitted along the cable unit from the stationary unit to the moving or mobile unit. The cable unit may allow an electrical signal to be transmitted along the cable unit from the moving or mobile unit to the stationary unit.

The moving unit may reciprocate between two positions. The cable unit may be bent as it extends from the stationary unit and the moving unit. As the moving unit reciprocates the cable unit may retain a constant or substantially constant radius of curvature.

In embodiments comprising at least one tube retained within the or each cable housing, fluid or fluid pressure may be transferred or transmitted from the stationary unit to the moving unit. The fluid may be a gas such as air. The fluid may be a liquid. Accordingly, the cable unit may be configured to transfer fluid between the stationary unit and the moving unit. In some embodiments the cable unit may be configured to transmit hydraulic power between the moving unit and the stationary unit.

It has been found that the provision of a cable unit according to the first aspect provides a secure connection between a stationary unit and a moving unit without tangling or twisting of the cables within the cable unit. Further, the cable unit according to the first aspect has been found to have a low bend radius, allowing the cable unit to be used in more applications where a large bend radius is not appropriate. Yet further, the cable unit according to the first aspect has been found to be configured to extend horizontally without requiring external support, thereby simplifying the construction of the cable unit. Accordingly, the cable unit may be self-supporting.

As referred to herein, the term "arcuate" refers to a support element that has a cross section that resembles an arc or curve.

The arcuate cross section may have a radius of curvature of at least about 10 mm, at least about 15 mm, at least about 20 mm, at least about 25 mm, at least about 30 mm, at least about 35 mm or at least about 40 mm. The arcuate cross section may have a radius of curvature of from about 10 mm to about 50 mm, from about 10 mm to about 45 mm, from about 10 mm to about 40 mm, from about 10 mm to about 35 mm, or from about 10 mm to about 30 mm. The arcuate cross section may have a radius of curvature of from about 15 mm to about 50 mm, from about 20 mm to about 50 mm, or from about 25 mm to about 50 mm.

Alternatively, the arcuate cross section may comprise a curved portion and at least one linear portion. The arcuate cross section may comprise a curved portion with a linear portion arranged either side of the curved portion.

The arcuate cross section may be formed by bending the support element along the middle of the cross section along the length of the support element.

In some embodiments, each support element may be arcuate along the length of the support element when not subjected to a bend or flex. The cross section of each support element may flatten as the support element is bent.

In some embodiments the cable unit may be bent over itself during use and each support element may flatten where the cable unit bends. The cable unit may be configured to bend over itself.

The radius of curvature of the arcuate cross section of the at least one support element retained within each support housing may vary along the length of the support element in the longitudinal direction. The radius of curvature of the arcuate cross section of the at least one support element retained within each support housing may change when the at least one support element is subject to bending across the width of the at least one support element. The radius of curvature of the arcuate cross section of the at least one support element retained within each support housing may be increased when the at least one support element is subject to bending across the width of the at least one support element. For example, when the cable unit is bent over itself across the width of the cable unit the at least one support unit will typically be bent across the width of the at least one support element and the radius of curvature of the arcuate cross section may be increased in the location of the bend.

The radius of curvature of the arcuate cross section may be increased adjacent to the location of the bend.

The support element may be in the form of an arcuate plate. The support element may be an elongate or elongated arcuate plate that extends along the length of the support housing within which it is retained. The arc of the support element may extend along the width of the support element. Accordingly, the support element may be curved across the width of the support element.

Typically, each support housing within the plurality of support housings may comprise an internal cavity within which the at least one support element is retained. The width of the internal cavity may be greater than the width of the at least one support element retained therein. The width of the internal cavity may be greater than the width of the at least one portion having an arcuate cross section of the at least one support element retained therein.

Each support housing may have a generally curved cross-section. Each support housing may have a circular cross-section. Each support housing may have an elliptical cross-section.

The or each cable housing may have a generally curved cross-section. The or each cable housing may have a circular cross-section. The or each cable housing may have an elliptical cross-section.

The provision of a cable unit having a cable housing and support housings that have a generally curved cross-section has been found to reduce or prevent wrinkling or creasing of the jacket that would otherwise be a source of dust or particulates over time.

Accordingly, the cable unit may be configured for use in clean environments which are required to be dust free.

Each of the at least one support element extends along substantially the length of the support housing within which it is retained in the longitudinal direction.

In some embodiments the or each of the at least one support element may comprise a material selected from the group consisting of: metallic materials selected from ferrous materials such as iron, steel or another alloy thereof, copper, aluminium, titanium, or alloys thereof; ceramic; rubber, plastic or reinforced ceramic, reinforced rubber or reinforced plastic. The material may be steel.

The at least one support element may comprise a protective layer. The protective layer may protect the at least one support element. The protective layer may protect the at least one support element from corrosion. The at least one support element may comprise an intermediate layer. The intermediate layer may be provided between the material of the at least one support element and the protective layer. The intermediate layer may improve the adhesion of the protective layer to the material of the at least one support element.

The or each at least one support element may comprise a material that is resilient to bending.

The cable unit may have a bend radius of less than about 100 mm. The cable unit may have a bend radius of less than about 75 mm. The cable unit may have a bend radius of less than about 50 mm. The cable unit may have a bend radius of less than about 25 mm. The cable unit may have a bend radius from about 10 mm to about 100 mm. The cable unit may have a bend radius from about 20 mm to about 75 mm. The cable unit may have a bend radius from about 20 mm to about 50 mm.

As used herein, the "bend radius" of the cable unit refers to the radius of curvature of the cable unit within the bend when the cable unit is bent back over itself.

The jacket may comprise a material that is resistant to degradation. The jacket may comprise a material that is flexible. The jacket may comprise a material that is resilient.

The jacket may comprise a protective material that protects the support elements and any cable or tube that is retained within the cable housing.

The jacket may comprise a resin. For example, the jacket may comprise a resin of a polymer. The polymer may comprise polytetrafluoroethylene (PTFE), fluorinated ethylene propylene (FEP), polyethylene (PE) or polyurethane (PU).

The jacket may be formed from two sheets. The two sheets may be welded together to form the at least one cable housing and the at least one support housing. The two sheets may comprise a polymer. The polymer may comprise PU, PTFE, FEP, PE.

Each of the two sheets may comprise an additional layer. The additional layer may be provided on the inside of the at least one cable housing and the at least one support housing. The additional layer may comprise a low friction material such that movement of objects or elements on the surface of the additional layer is not substantially impeded. Accordingly, the movement of support elements or cables or tubes within the at least one cable housing or within the at least one support housing. The additional layer may comprise PTFE, FEP or PE.

Each support housing within the plurality of support housings may be circular or elliptical in shape. Each support housing in the plurality of support housings may be configured to minimise folding or wrinkling of the portion of the jacket forming the support housing. Accordingly, the jacket may prevent or minimise the production of dust during use and therefore, the cable unit of the present aspect may be particularly suitable for applications where it is important that the environment is clean and free of all particulates, such as clean room environments.

Each support housing within the plurality of support housings may retain at least two support elements. Each support housing within the plurality of support housings may retain at least three support elements. Each support housing within the plurality of support housings may retain from one support element to five support elements. Each support housing within the plurality of support housings may retain from one to four support elements. Each support housing within the plurality of support housings may retain from one to three support elements. For example, each support housing within the plurality of support housings may retain one, two, or three support elements.

In embodiments where each support housing within the plurality of support housings retains at least two support elements, the at least two support elements may at least partially overlap within the support housing. The at least two support elements may be positioned within the support housing side by side. The at least two support elements may be arranged in a stack within the support housing.

In embodiments where each support housing within the plurality of support housings retains at least two support elements, a layer may be provided between adjacent support elements. The layer may allow adjacent support layers to more easily move relative to one another. The layer may be a low friction layer. The layer may comprise a fluoropolymer, an expanded fluoropolymer, or a non-fluoropolymer. For example, the layer may comprise expanded polytetrafluoroethylene (ePTFE) or a polyimide such as poly(4,4'-oxydiphenylene-pyromellitimide) ("Kapton K" provided by DuPont, for example). The layer may comprise a non-fluoropolymer. The layer may comprise ultra-high molecular weight polyethylene, for example.

In embodiments where each support housing within the plurality of support housings retains at least three support elements, the at least three support elements may at least partially overlap within the support housing. The at least three support elements may be positioned within the support housing side by side. The at least three support elements may be arranged in a stack within the support housing.

The cable unit may comprise a plurality of cable unit layers. The cable unit may comprise from two to five cable unit layers. The cable unit may comprise from two to four cable unit layers. The cable unit may comprise from two to three cable unit layers.

In embodiments where the cable unit comprises a plurality of cable unit layers, the cable unit may comprise a first cable unit layer and a second cable unit layer. The first cable unit layer may be provided on the second cable unit layer. Accordingly, the cable unit may comprise a stack of the first cable unit layer and the second cable unit layer.

The first cable layer may comprise a jacket comprising at least one cable housing. The first cable layer may comprise a jacket comprising at least one support housing.

The second cable layer may comprise a jacket comprising at least one cable housing. The second cable layer may comprise a jacket comprising at least one support housing.

The jacket of at least one of the first cable layer and the second cable layer comprises at least one cable housing. The jacket of at least one of the first cable layer and the second cable layer comprises at least one support housing. The jacket of the first cable layer and the second cable layer comprise at least one support housing.

In embodiments where the first cable layer and the second cable layer comprise at least one support housing, the support elements retained within the at least one support housing of the first cable layer and the support elements retained within the at least one support housing of the second cable layer may be arranged in the same orientation to each other. The support elements retained within the at least one support housing of the first cable layer and the support elements retained within the at least one support housing of the second cable layer may be arranged in a different orientation to each other. For example, in embodiments where the support elements are curved, the support elements retained within the at least one support housing of the first cable layer may be curved in the opposite direction to the support elements retained within the at least one support housing of the second cable layer.

Each cable unit layer within the plurality of cable unit layers may have the same width. At least one cable unit layer within the plurality of cable unit layers may have a different width to the other cable unit layers of the plurality of cable unit layers.

In some embodiments the sum of the support housings and cable housings of a first cable unit layer may be even and the sum of the support housings and cable housings of a second cable unit layer may be odd. Alternatively, the sum of the support housings and cable housings of a first cable unit layer may be odd and the sum of the support housings and cable housings of a second cable unit layer may be even. Accordingly, the housings (support housings and cable housings) of the first cable unit layer may be positioned between the housings (support housings and cable housings) of the second cable unit layer, for example.

An intermediate layer may be provided between adjacent cable unit layers. The intermediate layer may not comprise a support housing or a cable unit housing. The intermediate layer may be provided to reduce or minimise abrasion between adjacent cable unit layers. The intermediate layer may comprise a material that has a low coefficient of friction. The intermediate layer may comprise a fluoropolymer, an expanded fluoropolymer, or a non-fluoropolymer. For example, the intermediate layer may comprise expanded polytetrafluoroethylene (ePTFE) or a polyimide such as poly(4,4'-oxydiphenylene-pyromellitimide) ("Kapton K" provided by DuPont, for example). The intermediate layer may comprise a non-fluoropolymer. The intermediate layer may comprise ultra-high molecular weight polyethylene, for example.

Each cable unit layer within the plurality of cable unit layers may connect a stationary unit to a moving unit. Accordingly, each cable unit layer within the plurality of cable unit layers may be fixed at each end and therefore each cable unit layer within the plurality of cable unit layers may move together during use.

BRIEF DESCRIPTION OF THE FIGURES

Embodiments of the present invention will now be described, by way of non-limiting example, with reference to the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In addition, in the entire specification, when one part is referred to as being 'connected' to another part, it should be understood that the former can be 'directly connected' to the latter, or 'indirectly connected' to the latter via an intervening part. Also, to 'include' a constituent element means that it may further include other elements, rather than excluding other elements, unless specifically stated otherwise.

Example 1

Figure 1:
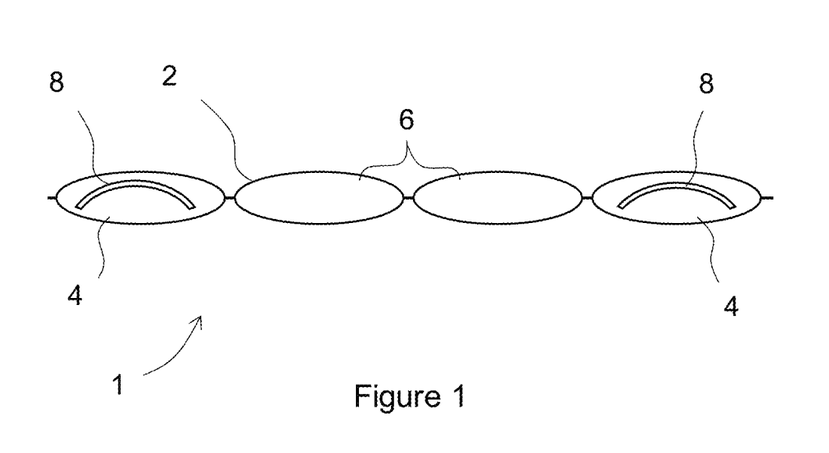
FIG. 1: A view of a cross section of a cable unit according to an embodiment.

With reference to FIG. 1, a cable unit 1 comprises a jacket 2 forming two support element housings 4 and two cable housings 6. The jacket 2 is made by two sheets of polyurethane with a PTFE coating where the two sheets are welded to form the support element housings 4 and the cable housings 6 such that the PTFE coating is provided on the inside of the support element housings 4 and the cable housings 6. The two support element housings 4 are arranged either side of the two cable housings 6 in a width direction, and the cross-section of the cable unit 1 is shown in FIG. 1. Each of the two support element housings 4 retain a single support element 8 that each have an arcuate cross-section. Cables and/or tubes may be inserted into the cable housings and the cable unit including the cables and/or tubes may then be used to connect a stationary unit and a moving unit.

Example 2

Figure 2:
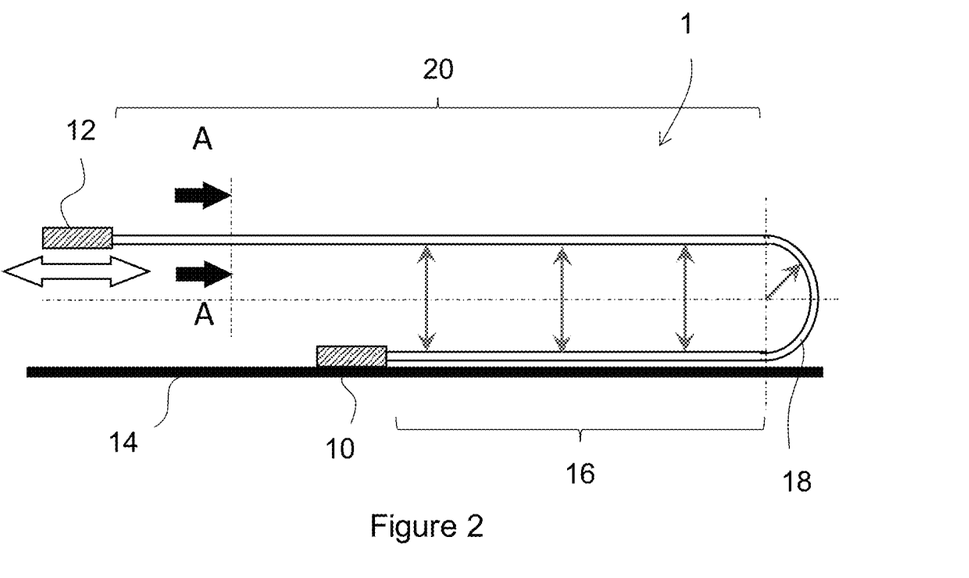
FIG. 2: A side view of a cable unit according to an embodiment.
Figure 3:
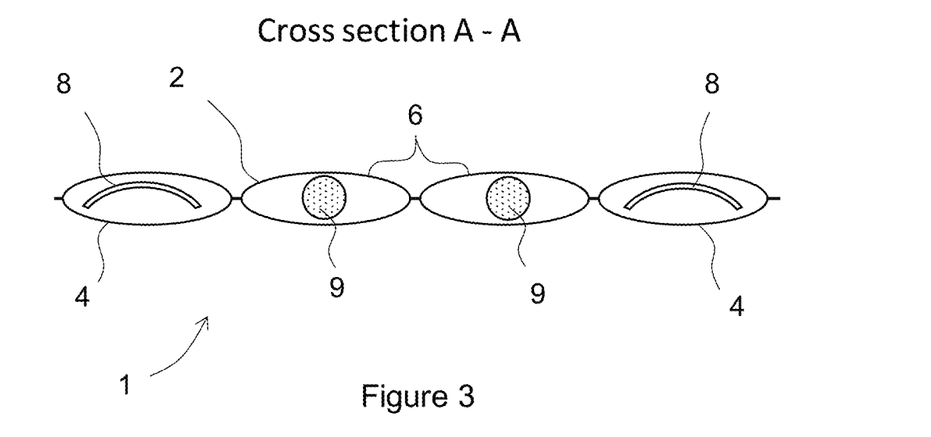
FIG. 3: A view of a cross section of the cable unit shown in FIG. 2.

With reference to FIG. 2, a cable unit 1 comprises a jacket 2 formed as described for Example 1, two support element housings 4 and two cable housings 6. The two support element housings 4 are arranged either side of the two cable housings 6 in a width direction, and the cross-section of the cable unit 1 at the point indicated as A-A in FIG. 2 is shown in FIG. 3. Each of the two support element housings 4 retain a single support element 8 that each have an arcuate cross-section. Each of the two cable housings 6 retains a cable 9.

The cable unit 1 extends between a stationary unit 10 and a moving unit 12. During use, the moving unit 12 reciprocates along a linear path (the direction of the linear path being indicated by the white arrow in FIG. 2) and the stationary unit 10 is positioned adjacent to the midpoint of that linear path. In the snapshot shown in FIG. 2, the cable unit 1 extends along a supporting surface 14 to which the stationary unit 10 is fixed and bends over itself to extend back over the stationary unit 10 to the moving unit 12 to form a first linear portion 16, a bend 18 and a second self-supporting linear portion 20. The bend 18 of the cable unit 1 has a radius of curvature of approximately 25 mm and as the moving unit 12 reciprocates along the linear path the position of the bend 18 also reciprocates along the supporting surface 14, the first linear portion 16 and the second self-supporting linear portion 20 extending and retracting in length accordingly.

The curve of the two support elements 8 in the second self-supporting linear portion 20 faces toward the first linear portion 16.

The jacket 2 comprises a PTFE sheet shaped to form the support element housings 4 and the cable housings 6.

Figure 4:
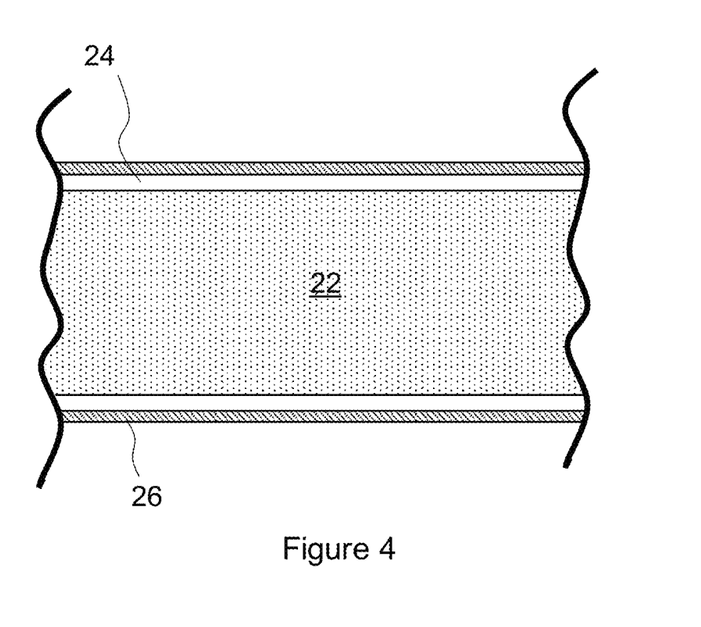
FIG. 4: A view of a cross section of a support element.

The support elements 8 are each formed from an elongate steel plate bent along the length of the steel plate such that they have an arcuate cross-section. The support elements 8 further comprise a coating 24 to protect the steel 22 from rusting and an outer layer 26 (see FIG. 4).

Example 3

Figure 5:
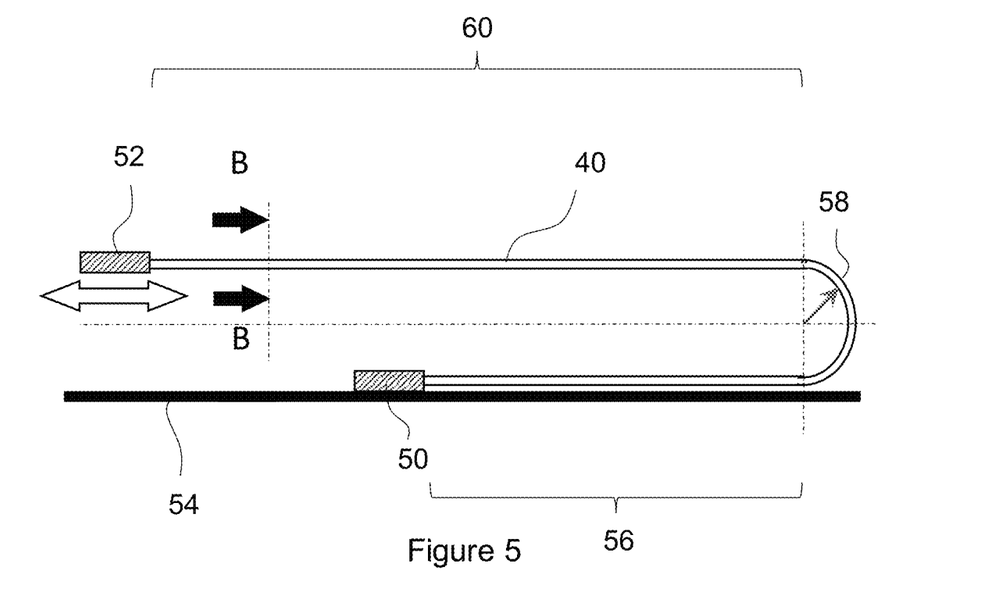
FIG. 5: A side view of a cable unit according to an embodiment.
Figure 6:
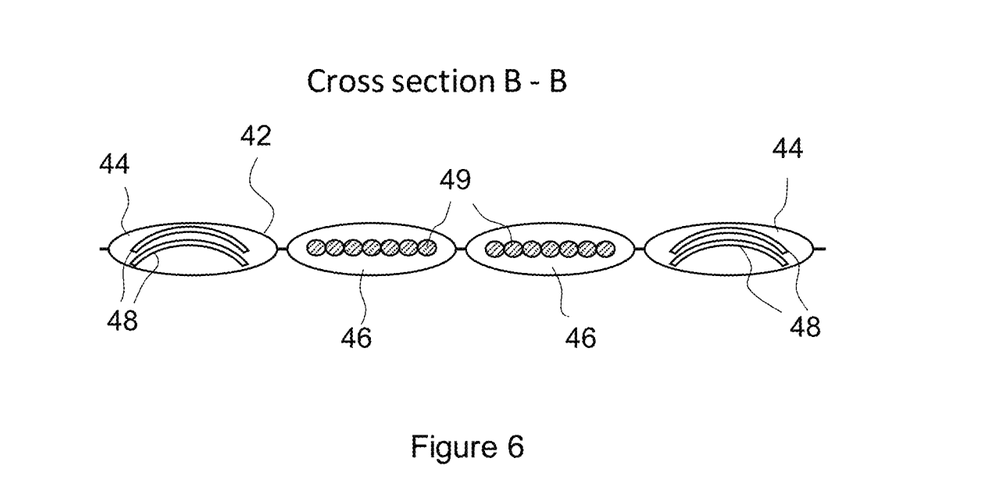
FIG. 6: A view of a cross section of the cable unit shown in FIG. 5.

With reference to FIGS. 5 and 6, a cable unit 40 comprises a jacket 42 formed as described above for Example 1, two support element housings 44 and two cable housings 46. The two support element housings 44 are arranged either side of the two cable housings 46 in a width direction, and the cross-section of the cable unit 40 at the point indicated as B-B in FIG. 5 is shown in FIG. 6. Each of the two support element housings 44 retain two support elements 48 that each have an arcuate cross-section. Each of the cable housings 46 comprise cables 49.

The cable unit 40 extends between a stationary unit 50 and a moving unit 52. During use, the moving unit 52 reciprocates along a linear path (the direction of the linear path being indicated by the white arrow in FIG. 5) and the stationary unit 50 is positioned adjacent to the midpoint of that linear path. In the snapshot shown in FIG. 5, the cable unit 40 extends along a supporting surface 54 to which the stationary unit 50 is fixed and bends over itself to extend back over the stationary unit 50 to the moving unit 52 to form a first linear portion 56, a bend 58 and a second self-supporting linear portion 60. The bend 58 of the cable unit 40 has a radius of curvature of approximately 25 mm and as the moving unit 52 reciprocates along the linear path the position of the bend 58 also reciprocates along the supporting surface 54, the first linear portion 56 and the second self-supporting linear portion 60 extending and retracting in length accordingly.

The supporting elements 48 and the jacket are as per Example 2.

The cables 49 provide an electrical connection between the stationary unit 50 and the moving unit 52 such that electrical power may be transmitted from the stationary unit 50 to the moving unit 52.

Example 4

Figure 7:
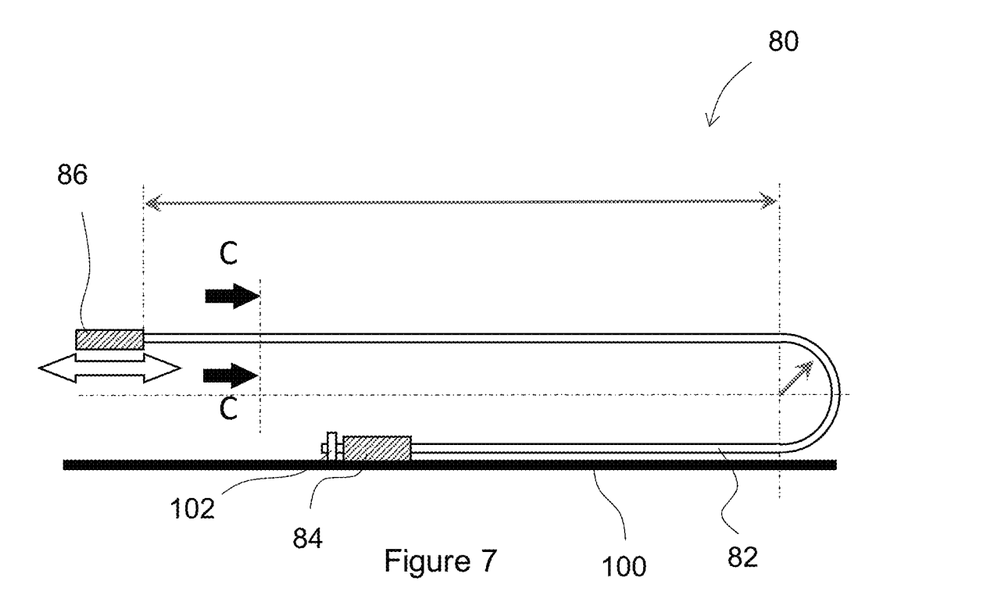
FIG. 7: A side view of a cable unit according to an embodiment.
Figure 8:
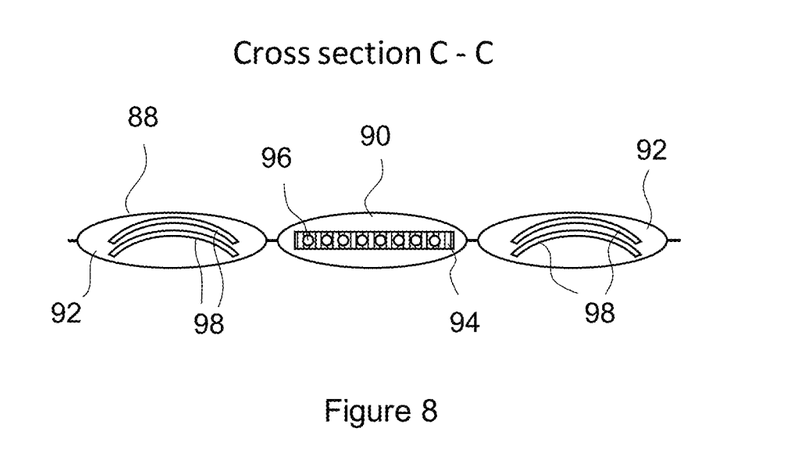
FIG. 8: A view of a cross section of the cable unit shown in FIG. 7.
Figure 9:
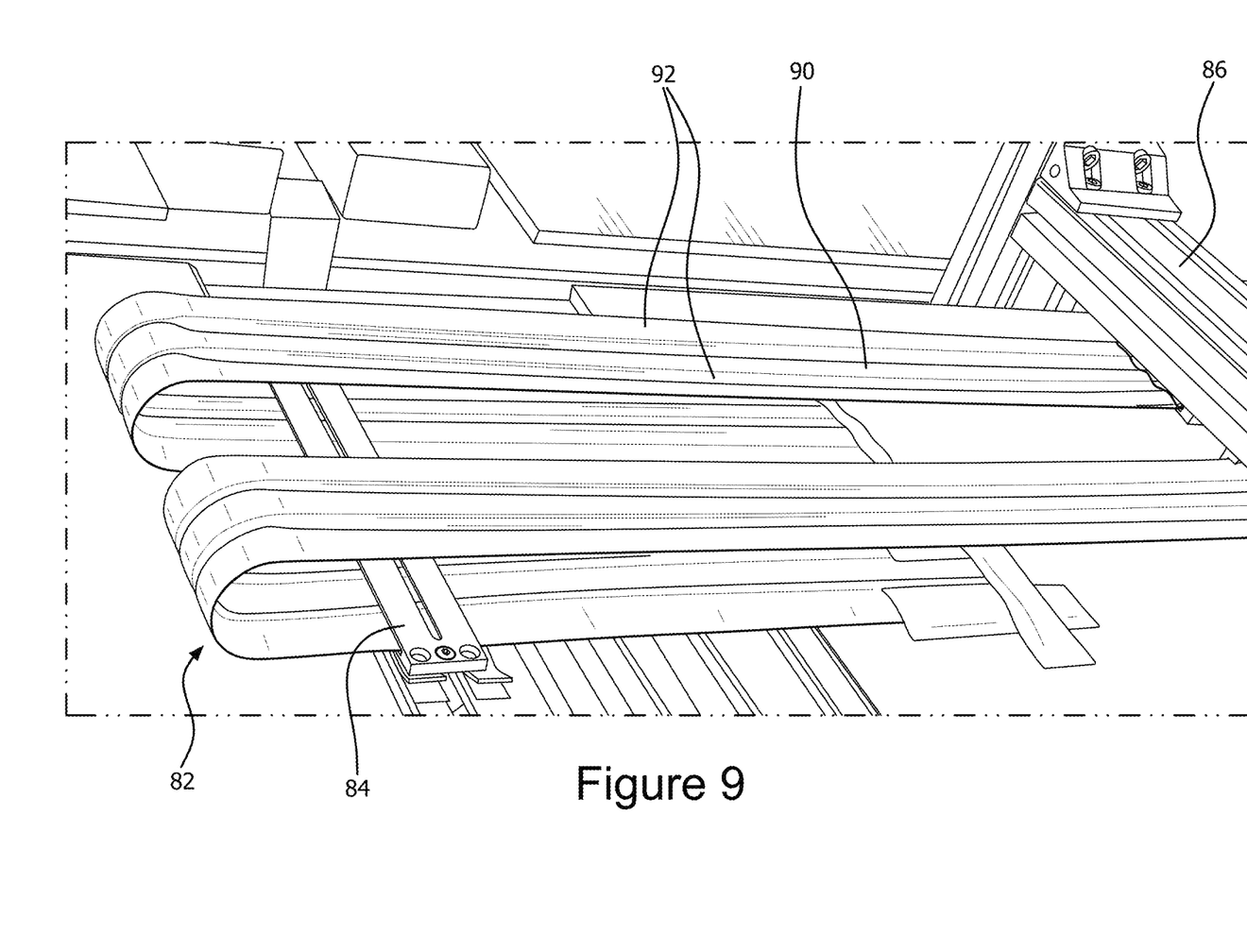
FIG. 9: A photograph of two cable units according to the embodiment of FIG. 7.

With reference to FIGS. 7-9, system 80 comprises a cable unit 82, a stationary unit 84, and a moving unit 86. The cable unit 82 comprises a jacket 88 defining a cable housing 90 and a support housing 92 (acting as a support element housing) provided either side of the cable housing 90. The cable unit 82 extends between the stationary unit 84 and the moving unit 86.

The cable housing 90 retains a cable block 94. The cable block 94 comprises cables 96 and the cable block 94 maintains the separation between the cables 96.

The support housings 92 comprise two support elements 98 stacked upon one another.

The jacket 88 comprises PTFE resin sheets connected together to form the cable housing 90 and support housing 92.

The stationary unit 84 anchors the cable unit to a support 100 and includes a pin 102 that fixes the cable unit to the support 100.

A cross-section of the point C-C of the cable unit of FIG. 7 is shown in FIG. 8.

A perspective view of this embodiment is shown in FIG. 9.

Example 5

Figure 10:
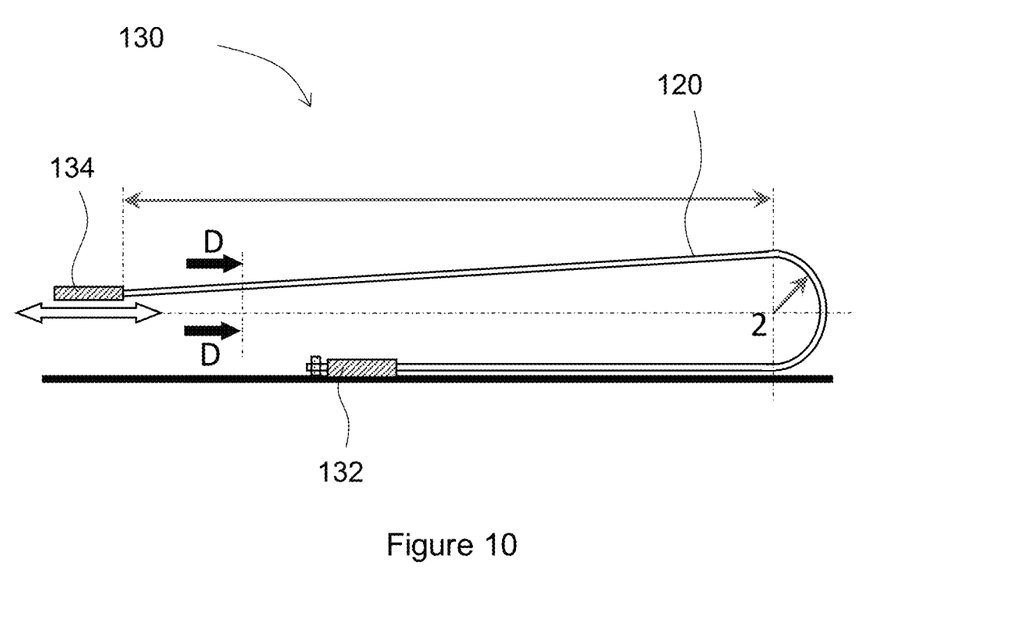
FIG. 10: A side view of a cable unit according to an embodiment.
Figure 11:
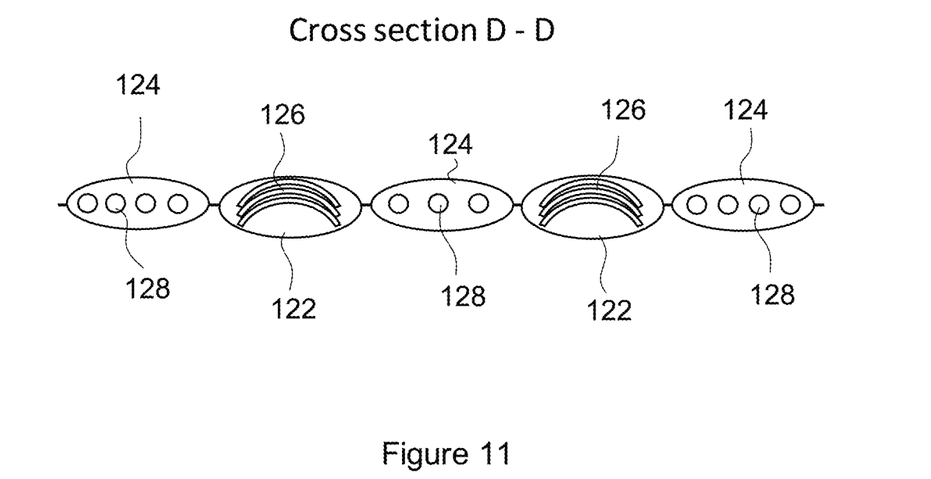
FIG. 11: A view of a cross section of the cable unit shown in FIG. 10.
Figure 12:
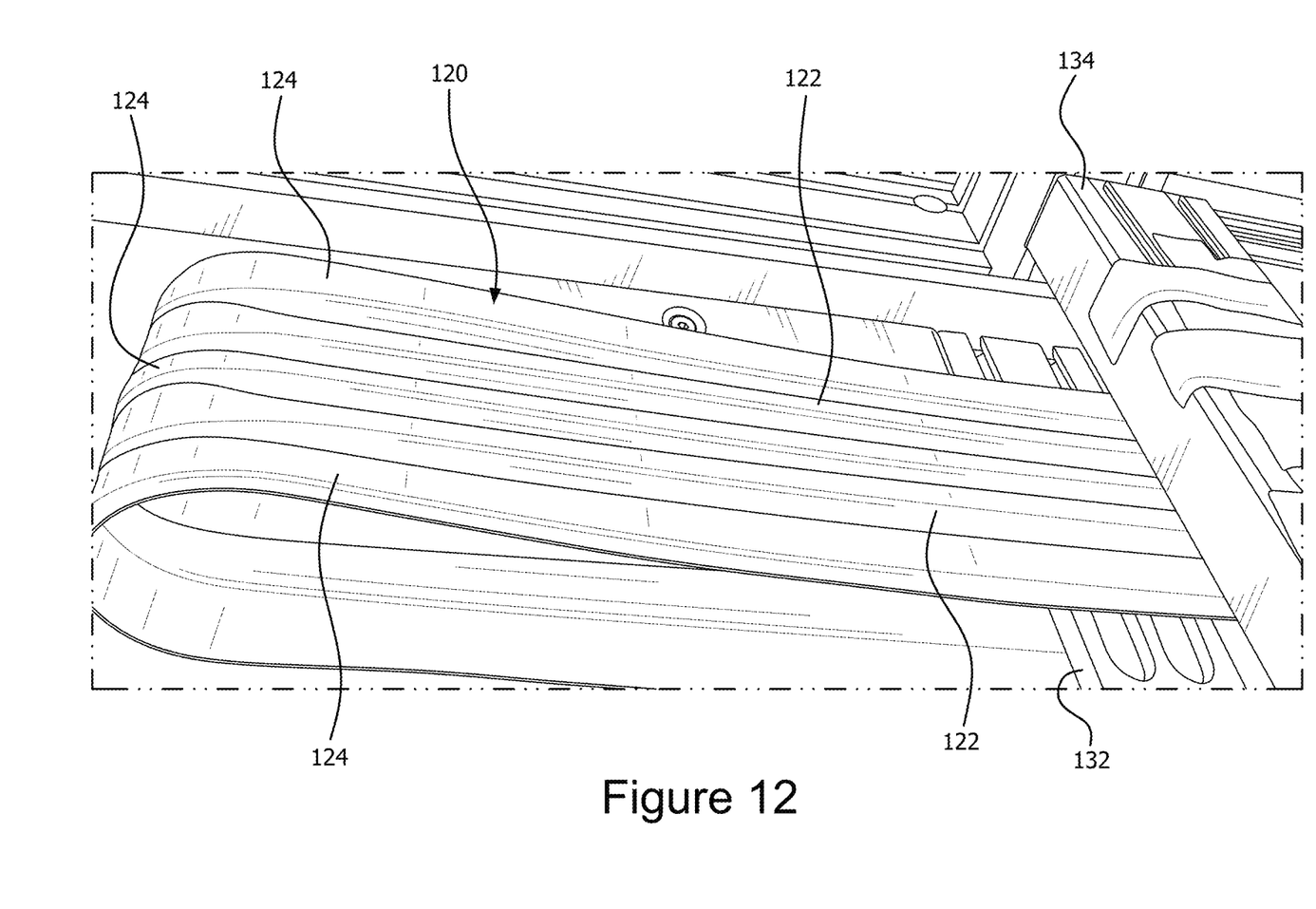
FIG. 12: A photograph of a cable units according to the embodiment of FIG. 10.

A further example of a cable unit is shown in FIGS. 10-12. The cable unit 120 comprises two support housings 122 and three cable housings 124, the support housings 122 interleaved between the cable housings 124. The support housings 122 retain three support elements 126, and the cable housings 124 retain cables 128.

The cable unit 120 is provided within a system 130. The cable unit 120 extends between a hub 132 (acting as a stationary unit) and a mobile unit 134 (acting as a moving unit). The hub 132 anchors the cable unit 120 to a support 136.

A cross-section of the point D-D of the cable unit of FIG. 10 is shown in FIG. 11.

Example 6

The arcuate cross-section of the support elements described in the above examples typically change shape depending on the degree of bend applied to the support elements. Specifically, the radius of curvature of the arcuate cross-section increases as the amount of bend applied to the support element increases.

Figure 13:
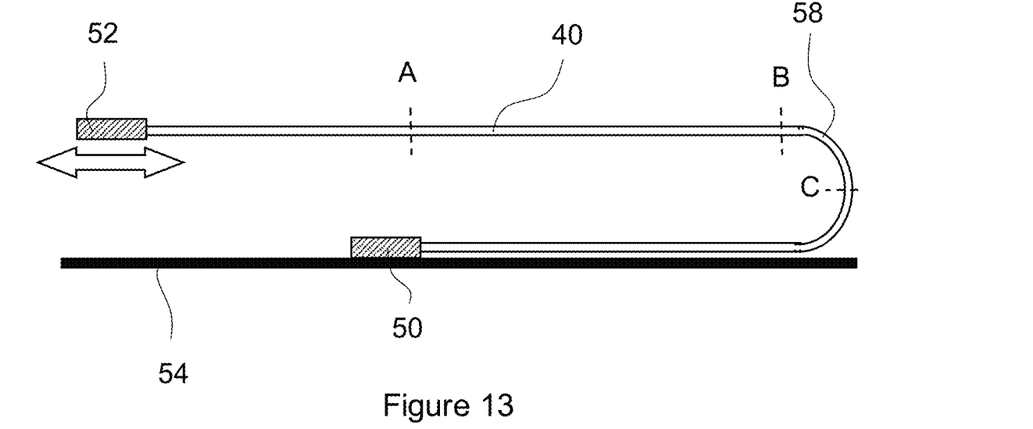
FIG. 13: A side view of a cable unit according to an embodiment.
Figure 14A:
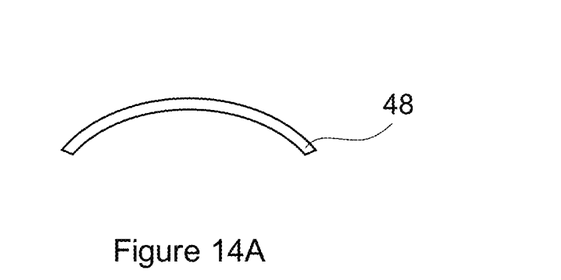
FIGS. 14A-14C: The shape of the cross section of a support element of the cable unit of FIG. 13A) far from the bend, B) close to the bend and C) in the bend.
Figure 14B:
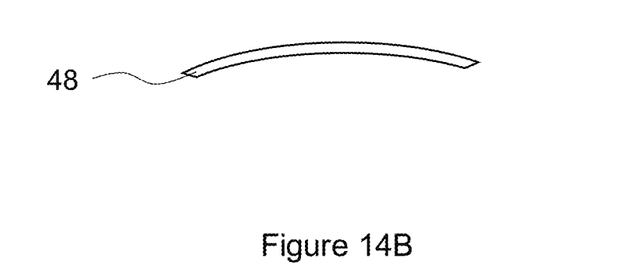
Figure 14C:
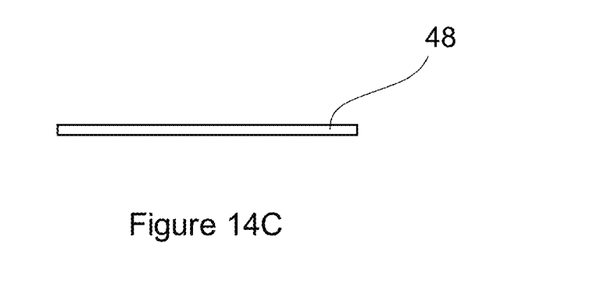

For example, referring to FIG. 13 the radius of curvature of the support elements 48 of Example 3 retained within the support housings of a cable unit changes from the radius of curvature of the unstressed, unbent arcuate cross-section at point A (cross-section shown in FIG. 14A), adjacent to a bend (cross-section shown in FIG. 14B) and within the bend itself (cross-section shown in FIG. 14C).

Example 7

Figure 15:
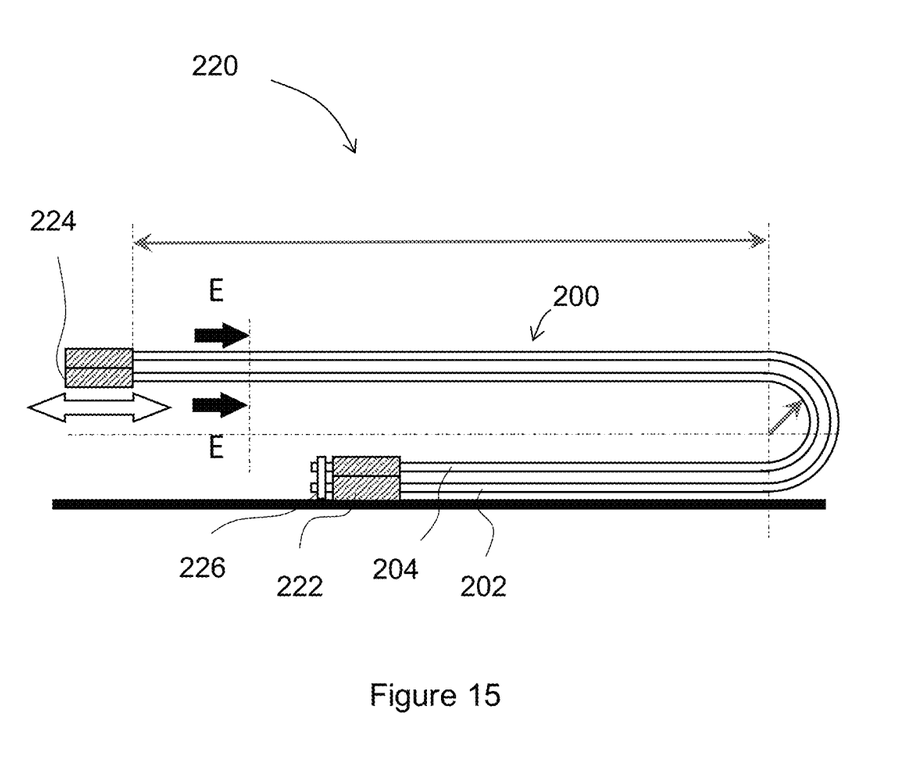
FIG. 15: A side view of a cable unit according to an embodiment.
Figure 16:
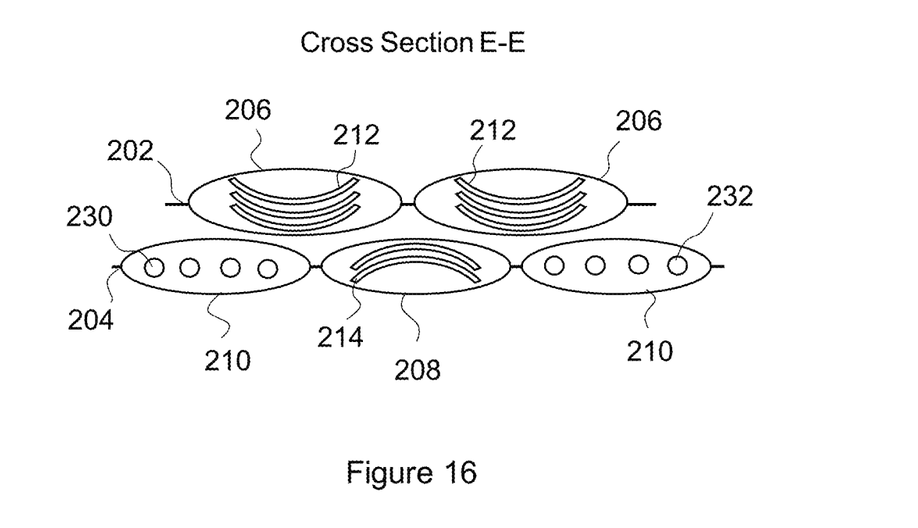
FIG. 16: A view of a cross section E-E of the cable unit shown in FIG. 15.

A further example of a cable unit is shown in FIGS. 15 and 16. The cable unit 200 comprises a first layer 202 and a second layer 204. The first layer 202 comprises two support housings 206. The second layer 204 comprises a support housing 208 positioned between two cable housings 210. The cable housings 210 retain cables (for example 230 and 232). The support housings 206 of the first layer 202 retain five support elements 212 and the support housing 208 of the second layer 204 retain three support elements 214. The support elements 212 are curved away from the second layer 204. The support elements 214 are curved away from the first layer. Accordingly, the support elements 212 of the first layer 202 are oriented opposed to the support elements 214 of the second layer 204.

The cable unit 200 is provided within a system 220. The cable unit 200 extends between a hub 222 (acting as a stationary unit) and a mobile unit 224 (acting as a moving unit). The hub 222 anchors the cable unit 200 to a support 226.

A cross-section of the point E-E of the cable unit of FIG. 15 is shown in FIG. 16.

The first layer 202 had a radius of curvature in a curved section of 32 mm and the second layer 204 had a radius of curvature in a curved section of 22.5 mm.

Accordingly, the provision of a cable unit having a first layer 202 and a second layer 204 achieved a smaller radius of curvature than would otherwise be possible with a single layer with similar materials.

Example 8

Figure 17:
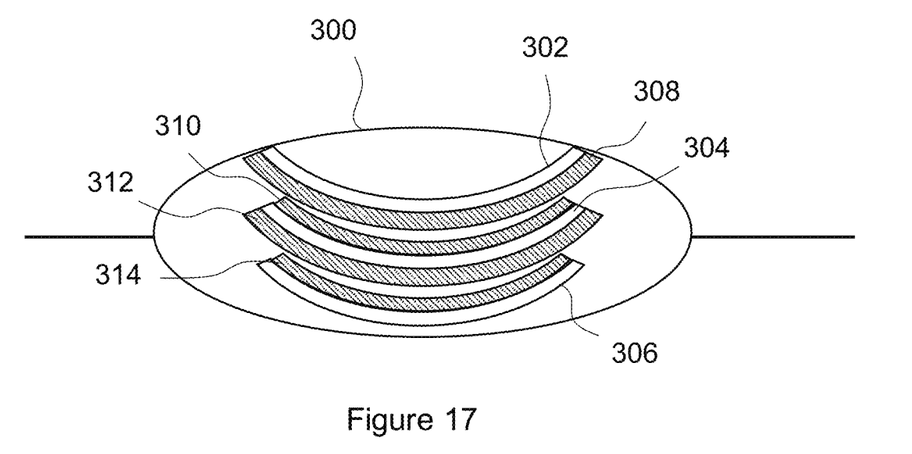
FIG. 17: A view of a cross section of a support housing according to an embodiment.

A further example of a support housing that can be used in the cable units of examples 1-7 is shown in FIG. 17. The support housing 300 retains a first support element 302, a second support element 304 and a third support element 306. The first support element 302 has a low friction layer 308 on the side facing the second support element 304. The second support element 304 has a low friction layer 310 on a first side facing the first support element 302 and a low friction layer 312 on a second side facing the third support element 306. The third support element 306 has a low friction layer 314 on a first side facing the second support element 304. The low friction layers 308, 310, 312, 314 comprises PTFE.

Example 9

Figure 18:
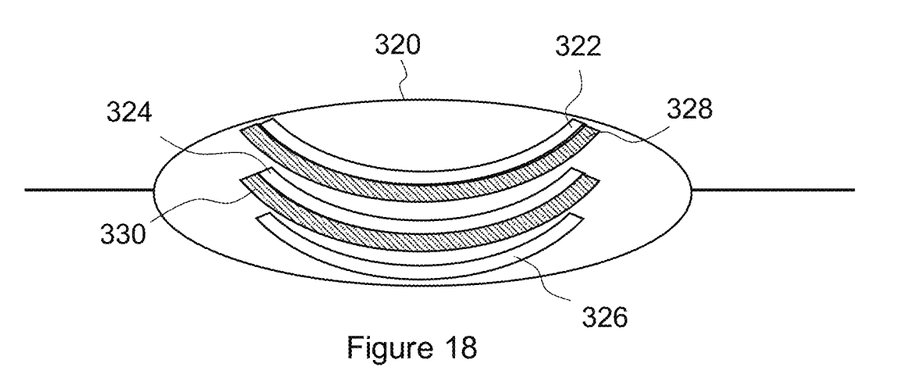
FIG. 18: A view of a cross section of a support housing according to an embodiment.

A further example of a support housing that can be used in the cable units of examples 1-7 is shown in FIG. 18. The support housing 320 retains a first support element 322, a second support element 324 and a third support element 326. The first support element 322 has a low friction layer 328 on the side facing the second support element 324. The second support element 324 has a low friction layer 330 on a first side facing the third support element 326. The low friction layers 328, 330 comprises PTFE.

Accordingly, in both Example 8 and Example 9 a low friction surface is provided between adjacent support elements to ensure that they are free or freer to move past one another during use.

While there has been hereinbefore described approved embodiments of the present invention, it will be readily apparent that many and various changes and modifications in form, design, structure and arrangement of parts may be made for other embodiments without departing from the invention and it will be understood that all such changes and modifications are contemplated as embodiments as a part of the present invention as defined in the appended claims.

The invention claimed is:

1. A cable unit, characterised in that the cable unit comprises:
    a jacket comprising at least one cable housing and at least one support housing;
        the at least one cable housing having a tubular structure, extending in a longitudinal direction,
        the at least one support housing having a tubular structure, extending in the longitudinal direction, wherein the at least one support housing being disposed on one side of the at least one cable housing; and
    at least two support elements retained within the at least one support housing, wherein the at least two support elements retained within the at least one support housing have an arcuate cross section in the width direction along the length of the support elements when not subjected to a bend or flex;
    wherein a low friction layer is provided between adjacent support elements of the at least two support elements within the at least one support housing.

2. The cable unit of claim 1, wherein the jacket comprises at least two support housings including the at least one support housing, and the at least one support housing is disposed on each side of the at least one cable housing in a width direction and disposed in parallel to each other.

3. The cable unit of claim 1, wherein at least one cable is retained within the at least one cable housing.

4. The cable unit of claim 1, wherein the at least one support housing comprises an internal cavity within which the at least two support elements are retained, the internal cavity extending further in the width direction than the width of the at least one portion having an arcuate cross section of the at least two support elements retained therein.

5. The cable unit of claim 1, wherein the at least two support elements extends along substantially the length of the at least one support housing in the longitudinal direction.

6. The cable unit of claim 1, wherein the at least two support elements comprise a material selected from the group consisting of: metallic materials selected from ferrous materials, copper, aluminium, titanium, or alloys thereof; ceramic; rubber, plastic or reinforced ceramic, rubber or plastic.

7. The cable unit of claim 6, wherein the material is steel.

8. The cable unit of claim 1, wherein the at least two support elements at least partially overlap within the at least one support housing.

9. The cable unit of claim 1, comprising a plurality of cable unit layers, each cable unit layer comprising a cable unit jacket, wherein the cable unit jacket of at least one of the cable unit layers comprises a unit layer cable housing and the cable unit jacket of at least one of the cable unit layers comprises a unit layer support housing.

10. The cable unit of claim 9, wherein an intermediate layer is provided between each adjacent cable unit layer.

11. The cable unit of claim 1, further comprising a first cable unit layer and a second cable unit layer, the first cable unit layer comprising a first unit layer support housing and the second cable unit layer comprising a second unit layer support housing, and unit layer support elements retained within the first unit layer support housing of the first cable unit layer are oriented opposed to that of unit layer support elements retained within the second unit layer support housing of the second cable unit layer.

12. The cable unit of claim 11, wherein the unit layer support elements are arcuate and the direction of curvature of the unit layer support elements of the first cable unit layer is opposed to the direction of curvature of the unit layer support elements of the second cable unit layer.

13. The cable unit of claim 1, wherein the low friction layer comprises expanded polytetrafluoroethylene (ePTFE), a polyimide, or ultra-high molecular weight polyethylene (UHMWPE).

* * * * *